United States Patent [19]

Van As et al.

[11] Patent Number: 5,768,258
[45] Date of Patent: Jun. 16, 1998

[54] SELECTIVE CONGESTION CONTROL MECHANISM FOR INFORMATION NETWORKS

[75] Inventors: Harmen Roelof Van As; Hans Rudolf Schindler, both of Langnau, Switzerland

[73] Assignee: International Business Machines Corporation, Armonk, N.Y.

[21] Appl. No.: 624,597
[22] PCT Filed: Oct. 23, 1993
[86] PCT No.: PCT/EP93/02937
  § 371 Date: Apr. 17, 1996
  § 102(e) Date: Apr. 17, 1996
[87] PCT Pub. No.: WO95/11557
  PCT Pub. Date: Apr. 27, 1995
[51] Int. Cl.[6] .................................................. H04J 3/14
[52] U.S. Cl. ......................................... 370/236; 370/235
[58] Field of Search ..................................... 370/229, 230, 370/231, 232, 233, 234, 235, 236, 237, 238, 252, 253, 391, 395, 392, 394, 522, 468, 465

[56] References Cited

U.S. PATENT DOCUMENTS

| | | | |
|---|---|---|---|
| 5,115,429 | 5/1992 | Hluchyj et al. | 370/236 |
| 5,128,932 | 7/1992 | Li | 370/236 |
| 5,313,454 | 5/1994 | Bustini et al. | 370/236 |
| 5,367,523 | 11/1994 | Chang et al. | 370/235 |
| 5,457,687 | 10/1995 | Newman | 370/236 |
| 5,570,348 | 10/1996 | Holden | 370/236 |
| 5,631,935 | 5/1997 | Ginossar | 370/236 |
| 5,633,859 | 5/1997 | Jain et al. | 370/236 |

FOREIGN PATENT DOCUMENTS

| | | |
|---|---|---|
| 0487235 | 5/1992 | European Pat. Off. . |
| 2181926 | 4/1987 | United Kingdom . |

OTHER PUBLICATIONS

Gerla et al., "Congestion Control in Interconnected LANs," 1988 pp. 72–76.

*Primary Examiner*—Wellington Chin
*Assistant Examiner*—Huy D. Vu
*Attorney, Agent, or Firm*—Gerald K. Woods

[57] ABSTRACT

This invention is an implementation of a congestion control mechanism, especially for ATM networks supporting data services or other nonreserved bandwidth traffic, e.g. in multimedia applications. It reacts immediately upon detection of a traffic bottleneck by selectively and temporarily holding back the data traffic that is to pass the bottleneck (5). A congested node (3) transmits congestion notifications (36) containing routing label information and deferment information to upstream nodes (2), thus enabling selective, temporary throttling action. If congestions persist, further notifications may be spread backwards step by step, eventually reaching the sources. A specific implementation is given for PRIZMA type switching nodes.

7 Claims, 5 Drawing Sheets

SELECTIVE CONGESTION CONTROL MECHANISM FOR INFORMATION NETWORKS

TECHNICAL FIELD

The present invention concerns a congestion control mechanism for switch-based information networks. The Asynchronous Transfer Mode (ATM) of these networks can be introduced also for local area networking. A Local Area Network (LAN) predominantly has to cope with nonreserved bandwidth traffic, which is inherently unpredictable and very loss-sensitive. This application necessitates a congestion control mechanism that reacts immediately upon detection of a traffic bottleneck by temporarily holding back the data traffic that is to pass the bottleneck. Other traffic should be influenced as little as possible. The present invention discloses a selective congestion control mechanism which fulfills these needs and which is generally applicable in switch-based networks. It may be used in ATM switches and other types of switches.

BACKGROUND OF THE INVENTION

Communication in switch-based ATM networks is connection-oriented and all ATM cells belonging to a connection follow the same path by swapping their routing labels at the input port of each switch. (See *R. Handel, M. N. Huber*, "Integrated Broadband Networks: An Introduction to ATM-Based Networks," Addison-Wesley Publishing Company, 1991, and *W. E. Denzel, A.P.J. Engbersen, I. Iliadis, G. Karlsson*, "A Highly Modular Packet Switch for Gb/s Rates," International Switching Symposium, Yokohama, Japan, Oct. 1992, pp 236–240.) Thus, the actual routing decisions take only place during connection set-up, and routing is not considered as a critical issue in the ATM environment. In contrast, congestion control is already today considered to be one of the difficult challenges that must be solved. This is particularly true for the envisioned LAN emulation service.

The principle of throttling or holding back cells selectively is quite natural and in some sense it has been reported since the early days of packet switching. Still, only recently the advance in technology has made it possible to realize this idea economically and in a more sophisticated manner. Recent studies in this direction have been reported in *H. J. Chao*, "A General Architecture for Link-Layer Congestion Control in ATM Networks", International Switching Symposium, Yokohama, Oct. 1992, pp. 229–233; *J. Cherbonnier. j.-Y. Le Boudec* "A GFC Protocol for Congestion Avoidance in the ATM Connectionless Service," EFOC/LAN 92, Paris, Jun. 1992, paper LAN/150, pp. 305–309; *P. O. Mishra. H. Kanakia*, "A Hop-by-Hop Rate-Based Congestion Control Scheme", COMM'92, pp. 112–123. The Mishra et al reference; compares the behavior of a hop-by-hop congestion control mechanism with an end-to-end control mechanism. Simulation results clearly show its superiority over the slow reacting end-to-end control in terms of higher throughput, lower delay, smaller loss probability, and smaller buffer requirements. The Chaos reference shows the use of a dedicated Trafic Regulator & Scheduler (TRS) at each output port. If a switch's queue is congested, its TRS can send control information backwards to some previous nodes along the paths to produce selective back-pressure. A TRS uses back-pressure signals from a congested node to selectively throttle traffic by reducing the average transmission rates of congested routes.

In a data environment, congestion cannot be resolved by discarding cells. Discarding cells owing to buffer overflow is a practice that originates from the telecommunication culture with a strong bias to real-time voice and video connections, which all require reserved bandwidth. Whereas for real-time applications, discarded cells are annoying for the user, but have no negative effect on the network. However discharging a single cell belonging to a data frame triggers definitely all the frame cells to be retransmitted, so that the network may become flooded by additional traffic without an increase in user throughput. Thus, discarding cells belonging to nonreserved traffic potentially consumes a significant part of the network capacity without any benefit.

It is a general object of this invention to avoid these different drawbacks of the prior art and to devise an implementation of a congestion control mechanism for information networks that reacts immediately upon detection of a traffic bottleneck by selectively and temporarily holding back the data traffic that is to pass the bottleneck. It is another object to provide such a mechanism which allows lossless operation especially for the nonreserved traffic. It is a further object to improve a network node by implementing in it a congestion control mechanism according to the invention. It is further intended to disclose an input-port module enabling immediate reaction through dedicated label bookkeeping, label searching, label filtering, and linked-list queueing.

SUMMARY OF THE INVENTION

The above objects are accomplished by an implementation of a congestion control mechanism wherein switching nodes which are upstream of a congested node are informed of a specific bottleneck by a notification containing routing label information, specifying which traffic must go on hold, and deferment information, specifying how long this traffic should be deferred. Preferably, this deferment information gives the duration of defer intervals for which selected traffic must go on hold, e.g. in cell units. Other deferment information might give a time point at which transmission may be resumed, or a quantity of information units which must arrive before transmission is restarted. Normal transmission can be resumed after deferment or a modified transmission may be enforced, e.g. with a certain delay or with a modified rate as is known per se. Even modified routing decisions could be taken to keep critical traffic flowing with help of alternative route. The congestion control mechanism according to the invention may be implemented in a few or all nodes of a network. Preferably, a congested node informs only its next neighbours upstream, which inform their upstream nodes only if, due to persisting congestion, their respective queues are also congested. In this way selective, temporary congestion information is spread upstream step by step. It eventually reaches even a source, which then can modify its transmission activities for congestion recovery. Clearly, it is also possible to directly inform more distant "neighbours", e.g. if the next neighbours do not support the mechanism or their interventions are not sufficient. The devised mechanism can be combined with other congestion control mechanisms, e.g. end-to-end control or local control within a switching node, and implemented in different types of switching nodes. Throughout the description, the ATM switch is used as a representative of these different types to clarify the explanations. An efficient implementation in this context comprises an extended input-port module in order to react immediately to congestion notifications from output-ports of the local switching node and from downstream nodes. With a congestion control mechanism according to the invention a network operates well for any traffic scenario applied to the network, for any insufficient but reasonable buffer sizing, and for any network topology. Of course, traffic smoothing, efficient traffic separation during connection set-up, or sufficient buffer space alleviate the occurrence of congestion, but the mechanism according to the invention is projected to cope with the many unknowns in traffic patterns, source parameter settings, and system dimensioning.

BRIEF DESCRIPTION OF THE DRAWINGS

An embodiment of the invention is described in detail below with reference to the drawings. To show more clearly the general inventive concept, an implementation in a typical switching node is assumed.

DETAILED DESCRIPTION OF AN EMBODIMENT ACCORDING TO THE INVENTION

In switch-based networks, it may occur that during a period of time many cells are switched to the same output port, usually connected to an output link. If the incoming rate of cells is larger than the link transmission rate, a bottleneck exists at this link. In order to prevent buffer overflow and thus cell loss, a reactive congestion control is necessary in such networks.

Figure 1:
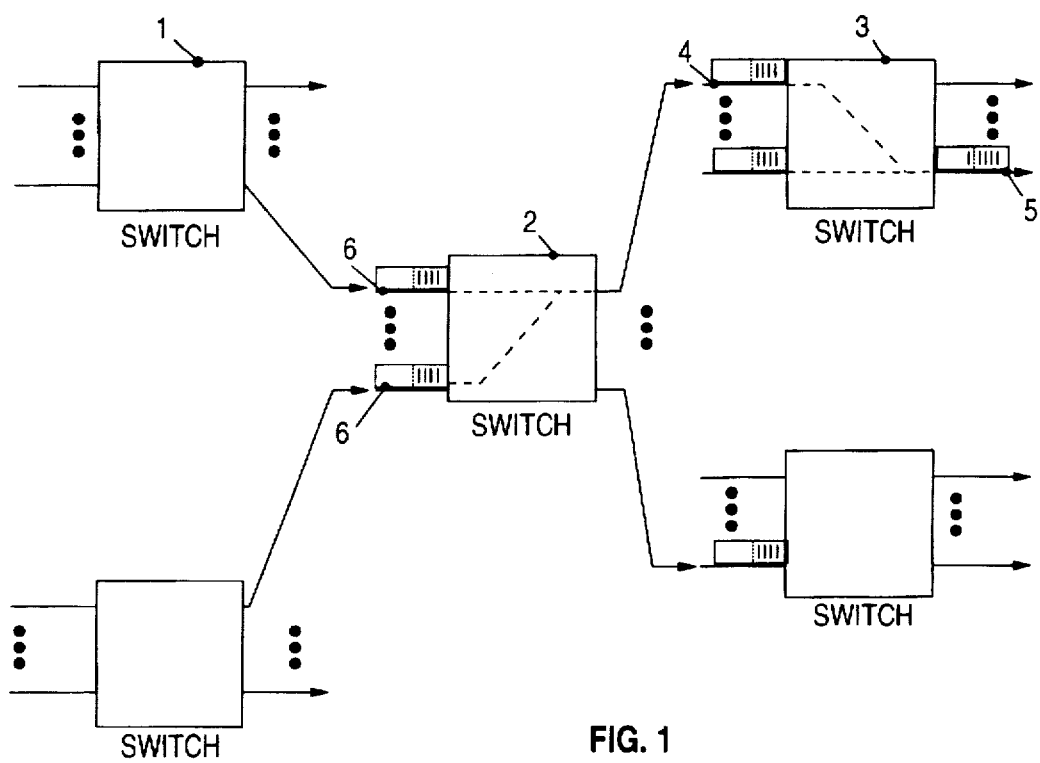
FIG. 1 illustrates schematically the concept of the selective congestion control mechanism according to the invention. A typical bottleneck situation in a switch-based network is assumed to explain this mechanism.

FIG. 1 illustrates three switches 1,2,3 in an arbitrarily meshed network. One of the output links 5 of switch 3 becomes congested. Now, the output port notifies all input ports 4 of switch 3 to hold back cells that flow via the bottleneck link 5. Each input port 4 filters therefore all cells with a Virtual Path or Channel Information (VPI/VCI) for the congested link 5. In the following, "label" or "routing label" is used as a generic term for VPI/VCI or other routing information. All cells to other links keep flowing. If the congestion dissolves before the number of queued cells at an input port 4 exceeds a given threshold, no further action is taken. The local congestion control was sufficient. Otherwise, the input port 4 notifies the congestion to its upstream switch 2 which relays this information to all its input ports 6. Here, all cells with a label indicating that they will flow via the bottleneck link 5 of switch 3 will go on hold for a period according to the deferment information in the notification. This selective, temporary backpressure may be continued node by node up to the sources. However, for short periods of congestion, backward notification remains generally limited to a small geographical area. Short overloads are resolved first only locally and then bottleneck information is selectively spread backwards step by step towards the sources when congestion persists. All traffic not passing bottlenecks continues to flow normally. With the disclosed implementation, a lossless operation is obtainable which is especially important for the nonreserved traffic in ATM networks.

Figure 2:
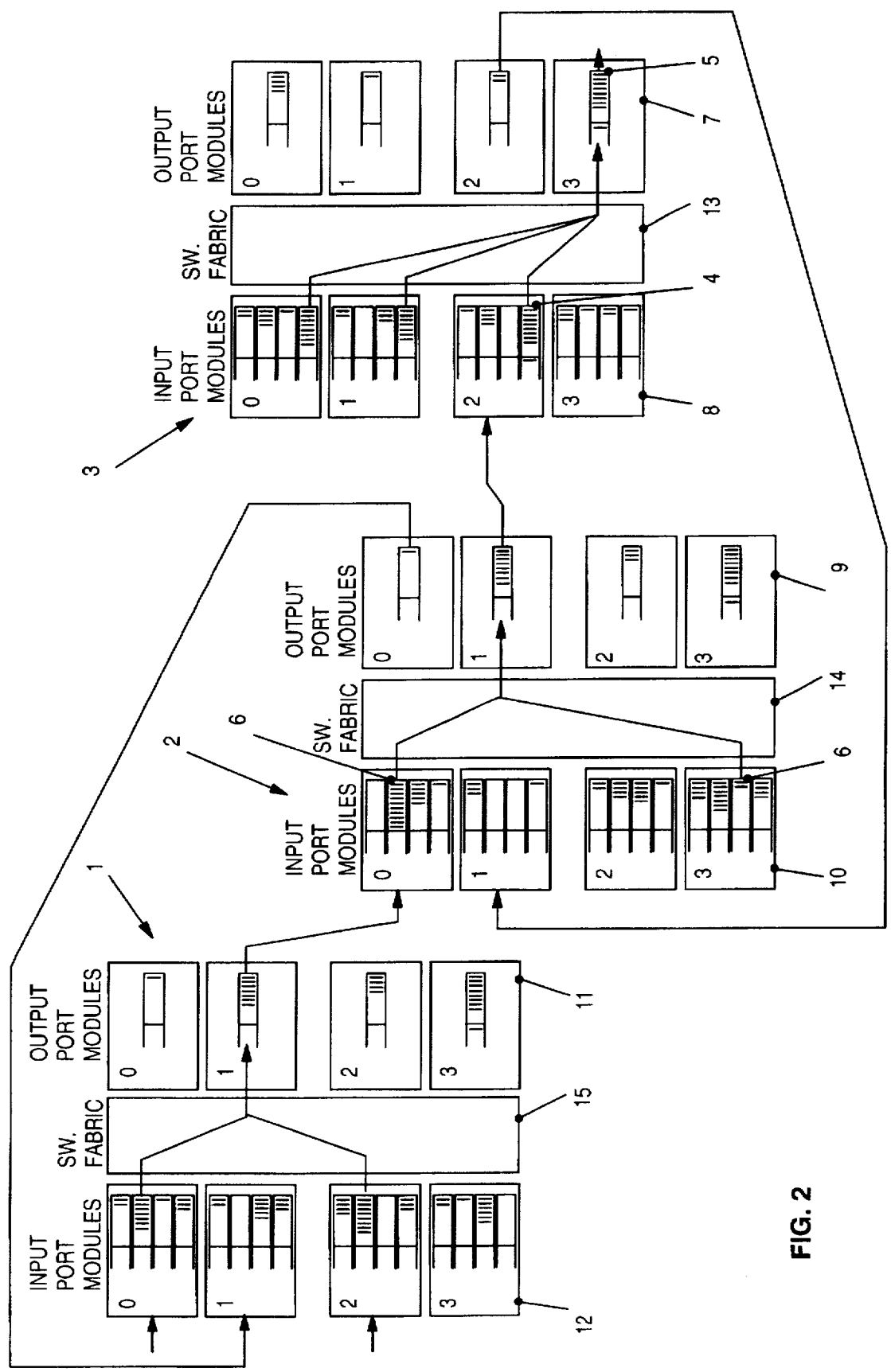
FIG. 2 shows a more detailed description of the information flow for the situation of FIG. 1.

The control mechanism is further detailed in FIG. 2. Again three switches 1,2,3 in an arbitrarily meshed network are considered. To simplify the description, an embodiment is shown wherein each switch consists of one of sets 8, 10, 12 four input-port modules a 4×4 switching fabric 13,14,15, and one of three sets 7, 9, 11 of four output-port modules Individual and Input ports in sets 7–12 are numbered from 0 through 3. It is further assumed that all switches are connected by duplex links and that an input/output-port pair has an internal communication path. Cells waiting for transmission (output-port module) on a specific output set are enqueued in a single queue. In contrast, an input-port module has as many queues as there are output ports (i.e. four queues in this example). If output port $7^3$ of switch 3 becomes congested, this can be detected by the link buffer occupancy exceeding a given threshold. As result, output port $7^3$ notifies all the input ports 8 of switch 3 to hold back all cells that will flow via the congested link 5. Since in this example, a single-stage switching fabric 13 is considered, it is assumed that the notification is done via a hardware-generated signal. Otherwise, the output-port module $7^3$ broadcasts the notice via ATM cells flowing through the switching fabric to all input ports 8. In the latter case, an output-port module $7^3$ sends (via its input-port module $8^3$) a control cell to all other output-port modules $7^0$ to $7^2$ which relay that cell internally to their input-port module $8^0$ to $8^2$. If traffic to output port $7^3$ of switch 3 is held back at the input ports 8, some queues at the input side will fill up. If for instance queue 4 at input port $8^2$ exceeds a given threshold, a notification, in this embodiment called a "throttle cell", is created to inform the switching nodes upstream that the traffic leading to congestion should be throttled. The throttle cell is sent to upstream switch 2 via output port $7^2$ of switch 3 and arrives in switch 2 via input port $10^1$. The throttle cell is then relayed to output port $9^1$ via its internal communication path. Finally, the cell is broadcasted to all the other input ports $10^0$, $10^2$, $10^3$ of the switch 2 to notify which cells to hold back. As congestion persists and queue 6 in input port $10^0$ of switch 2 fills beyond the threshold, a further throttle cell is generated, now to hold up traffic coming from port $11^1$ of upstream switch 1. A throttle cell contains the routing label message of the cells that must go on hold and a deferment information in this embodiment specifying the duration of the defer interval in cell units. The 48-byte payload of a 53-byte cell could carry twelve 28-bit routing labels and a 16-bit deferment message.

Figure 3:
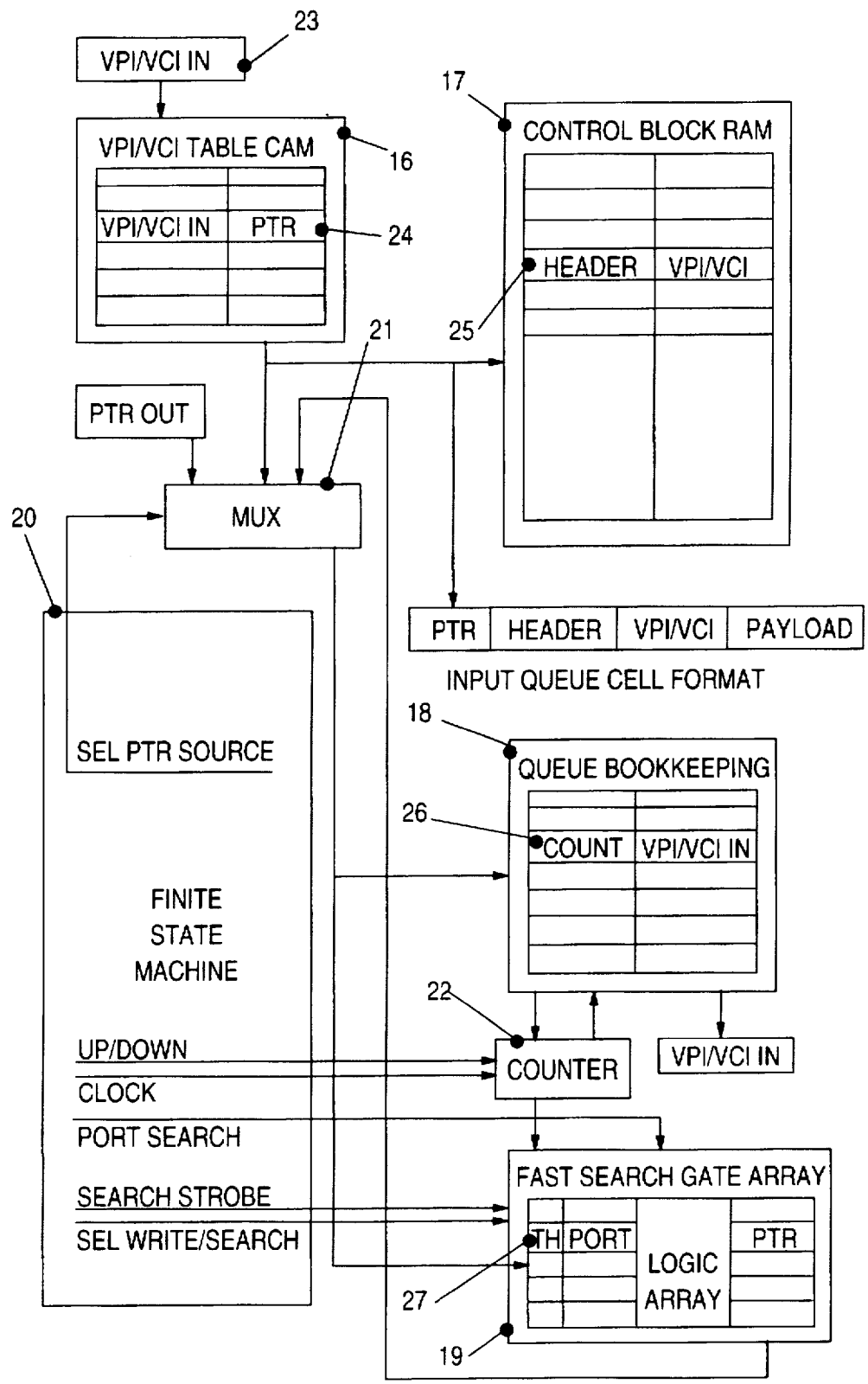
FIG. 3 depicts the extended label swapping hardware of an input-port module which allows for label bookkeeping.

In order to react immediately, an input-port module 8,10, 12 (where also cell label swapping is performed) keeps track of all cells that are currently stored in each of its queues as they are waiting to be switched to the corresponding output port 7,9,11. This label bookkeeping is illustrated in FIG. 3. To this end, the label swapping hardware consisting of the Label Table (CAM) 16 and Control Block (RAM) 17 is extended by a Queue Bookkeeping Table 18, a Fast Search Gate Array 19, and the controlling parts comprising a Finite State Machine 20 and a Multiplexer 21. At connection set-up, the incoming label 23 is given an address pointer 24 to a free memory entry 25 in the Control Block 17. This part is needed to perform the label swapping procedure. For congestion control, the same pointer 24 is now also used to relate that label to entries 26, 27 in the Queue Bookkeeping Table 18 and the Fast Search Gate Array 19.

The tables have the following contents:

An entry in the Label Table 16 contains an incoming label and a pointer 24. The incoming label 23 is the search key to find the corresponding pointer 24.

An entry 25 in the Control Block 17 contains the self-routing information through the considered switch (Header) and the outgoing label.

An entry 26 in the Queue Bookkeeping table 18 contains a cell count and the incoming label. The count monitors the number of cells associated with the incoming label that are enqueued for switching to one of the output ports.

An entry 27 in the Fast Search Gate Array 19 contains a "Threshold Exceeded Flag" (th) and the outgoing Port number. The same entry also contains its own address pointer.

During cell switching, the incoming label 23 of a cell is swapped into its outgoing label and the cell header is extended by the self-routing header (Header). In addition, the cell's pointer is appended as long as the cell is in the input-port module. When the cell is enqueued the cell count (given by the pointer) is incremented by one. The counter is decremented by one when the cell is dequeued for switching to its output port. The cell-count operation is executed by counter 22 which also triggers the operation of the "Threshold Exceeded Flag" depending on a given threshold setting. If the cell count exceeds a given threshold, a binary '1' is set into the Fast Search Gate Array 19. The flag is reset as soon as the cell count decreases again to the threshold.

If an input queue 4,6 becomes congested (e.g. due to backpressure from an output port 5), all connections leading to that port 5 must be found fast, in order to inform upstream switching nodes without delay that certain traffic should be throttled. These connections can be found quickly by means of the special-purpose gate-array 19. This is done by applying the number of the port that caused backpressure to the gate input 29 (designated 'Port search'), by applying a single clock pulse to the input 31 (designated 'clock'), and by periodically applying a strobe signal to the input 32 (designated 'Search Strobe'. The gate array 19 will then output consecutively pointer by pointer, each pointing to an entry 25 in the RAM 17 that describes a virtual connection or path that passes through the congested output port 5 and that has more cells waiting in the queue of the input card than the selected threshold indicates.

Figure 4:
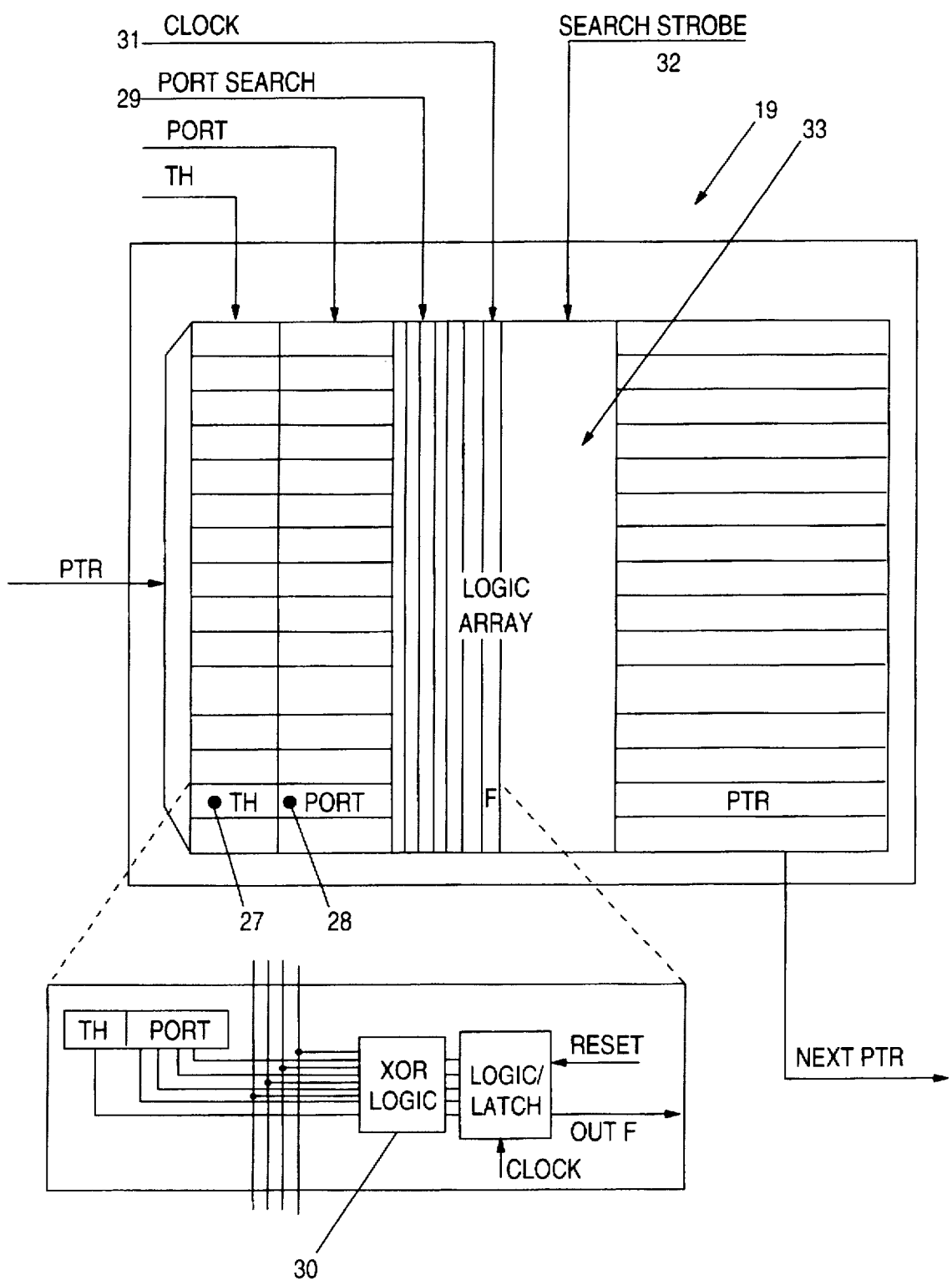
FIG. 4 illustrates a gate array known per se. Here, it is used for fast label searching.

In the gate array 19 shown in FIG. 4, the stored port numbers 28 and the applied port number 'Port search' are compared in parallel by means of four Exclusive ORs 30 per entry 27 (see lower part of figure). If the two port numbers 28,29 match and a '1' had been entered (at th) at the same address location 27, then the latch will be set at that location 27 when the clock pulse is applied. The OR array 33 to the right of the array is conceived such that a binary '1' at the output of a latch will propagate to all lines belonging to higher addresses. Thus only one Exclusive OR (XOR) to the right of the array will respond with a '1'. It is the one connected to the latch with the lowest address carrying a '1'. It selects the stored data to the very right of the array, which in general represents the address of the latch. A strobe signal will reset that latch (by means of an AND gate) and immediately the next higher pointer will appear, pointing to a RAM entry 25 as described above. The gate array 19 thus permits a very rapid search for all virtual connections that are causing congestion. A throttle cell can therefore be assembled very quickly and upstream switching nodes can be informed with minimum delay that certain traffic flows should be throttled.

The Fast Search Gate Array 19 is known per se; it is included in Patent Application EP 93810215.

To allow an input-port module 8,10,12 to decide whether it should hold up or switch a cell, label filtering is necessary.

Figure 5:
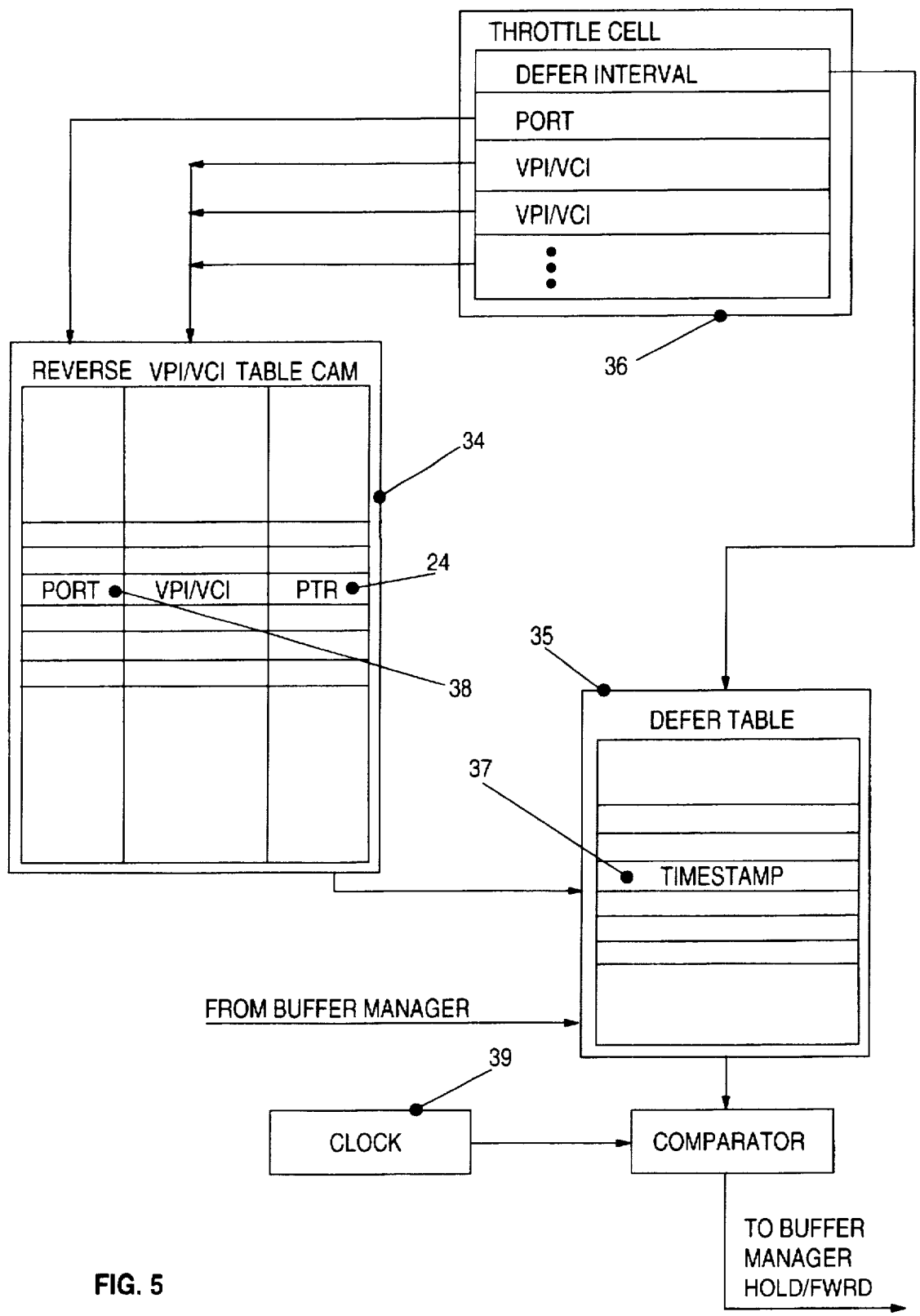
FIG. 5 depicts an input-port module hardware extension which allows label filtering and timestamping.

To execute this function, each input-port module 8,10,12 needs basically two additional hardware units: the Reverse Label table 34 and the Defer table 35. Label filtering is illustrated in FIG. 5. As for addressing the label bookkeeping units 18, the same pointer 24 is used. In the Reverse Label Table (CAM) 34, the pointer 24 is part of the CAM 34, whereas it is used as entry 37 address for the Defer Table 35.

The tables have the following contents:

An entry 38 in the Reverse Label Table 34 contains a port number, an outgoing label, and a pointer 24. Port and label form the search key to find the corresponding pointer.

An entry 37 in the Defer Table 35 consists of a timestamp that is compared with the system clock 39 to decide between holding or switching the corresponding cell.

The operation can be partitioned into two parts: (1) preparation of the Defer Table 35 based on the information carried in a throttle cell 36, and (2) checking at each cell time unit. Upon arrival of a throttle cell 36, the Defer Table 35 is updated by setting a timestamp at each pointer entry 37 given by the Reverse Label Table 34 using the port/label key as search entity. The timestamp is determined by adding the system time (clock 39) to the defer value given in the throttle cell 36. For each cell handled by an input-port module 8,10,12 the timestamp is compared to the system clock 39 to decide whether to hold or switch the cell.

Figure 6:
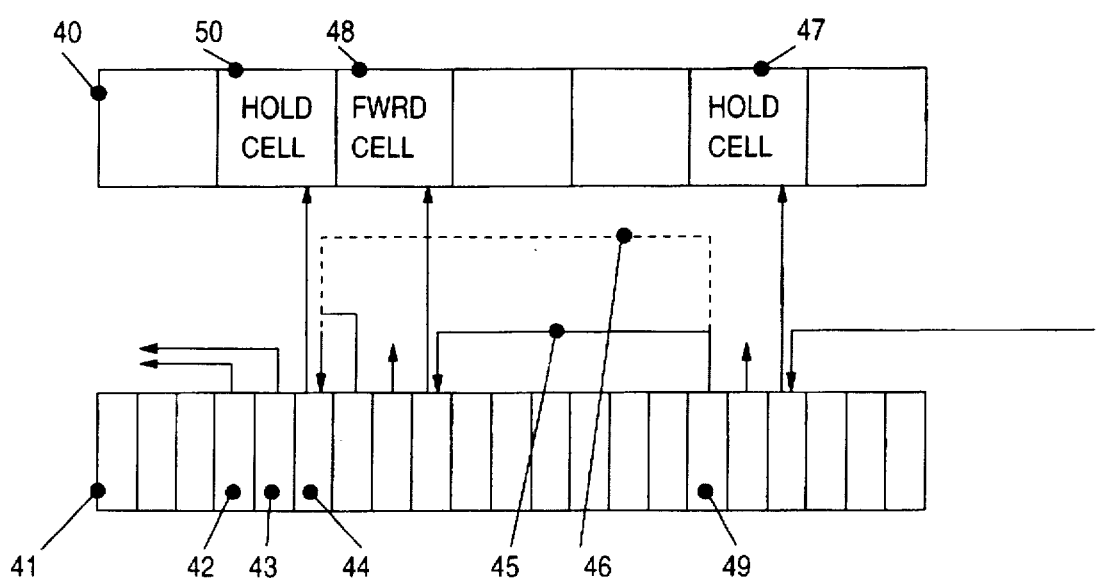
FIG. 6 illustrates the queueing organization by a linked list which is used in the input-port module.

FIG. 6 shows the queueing linkedlist organization for a single linked list. It consists of a Data Memory 40 and a Buffer Control Record Memory 41. The Data Memory 40 is structured such that it contains the cells. The Buffer Control Record Memory 41 incorporates the mechanism of a queueing linked list controlled by three entries for each cell:

a pointer 44 to the cell location in the Data Memory, a pointer 43 to the Defer Table, and a pointer 42 to the next cell control entity in the queue. Cells in a queue are held or dequeued depending on the status of the Defer Table entry 37. If a cell 47 is on hold, the next cell 48 in the queue is checked. If that one can be switched, it is taken out of the queue by replacing link pointer 49, thereby changing an old link 45 into a new link 46 and linking the previous cell on hold 47 to the next cell 50.

As should be clear from the foregoing detailed description, an implementation of a bottleneck-triggered selective congestion control mechanism is described which can be used in ATM networks. It reacts immediately upon detection of a traffic bottleneck by selectively and temporarily holding back the data traffic directed towards the bottleneck; this traffic can be recognized by inspecting the VPI/VCI label. A hardware structure is described which performs high-speed bookkeeping of all cells enqueued for being switched, in order to react immediately to congestion. A further hardware structure is described which performs high-speed label filtering in order to selectively hold back traffic for a congested link. But numerous modifications depending on the intended network environment and types of switching nodes could be made in accord with the general concept of the invention; all these different embodiments fall within the scope of said concept for a person skilled in the art.

We claim:

1. Switching device for routing information through a communication network with a back-holding congestion control mechanism, comprising a selective congestion notification device (8, 10, 12) for transmitting a congestion notification (36) to enable throttling of a selected virtual connection, said congestion notification (36) containing routing information and deferment information, said deferment information including a predetermined duration of a deferment interval for which traffic on said selected virtual connection must go on hold or the transmission rate of the selected virtual connection is reduced.

2. Switching device according to claim 1, wherein a virtual connection is selected by counting the number of cells incoming from each virtual connection and selecting the virtual connection for throttling whose cell count exceeds a given threshold.

3. Switching device according to claim 1, wherein said deferment message includes a point in time at which transmission may be resumed at normal speed or a quantity of information units which must arrive before transmission is restarted.

4. Switching device according to claim 1, comprising at least an input-port module (8, 10, 12), a switching fabric (13, 14, 15) and an output-port module (7, 9, 11), wherein said input-port module (8, 10, 12) comprises a selective throttling device (18–22, 34, 35, 40, 41) for temporarily stopping transmission on the selected virtual connection or temporarily reducing transmission rate.

5. Switching device according to claim 4, wherein the throttling device (18–22, 34, 35, 40, 41) is designed to react to a congestion notification (36).

6. Switching device according to claim 4 or 5, further comprising a local congestion control mechanism, wherein a congested output-port module (7) notifies the input-port modules (8, 10, 12) to selectively hold back traffic which otherwise would cause further congestion.

7. Switching device according to claim 6, wherein the throttling device comprises dedicated devices for label bookkeeping (18–22), label searching (19), label filtering (34, 35), timestamping (35), and/or linked-list queueing.

* * * * *